United States Patent Office 3,637,626
Patented Jan. 25, 1972

3,637,626
PROCESS FOR THE POLYMERIZATION OF
VINYL CHLORIDE
Corrado Mazzolini, Sergio Lo Monaco, Luigi Patron, and Alberto Moretti, Mestre, and Marcello Di Ciolo, Treviso, Italy, assignors to Chatillon Società Anonima Italiana per le Fibre Tessili Artificiali S.p.A., Milan, Italy
No Drawing. Filed Mar. 28, 1969, Ser. No. 811,576
Claims priority, application Italy, Apr. 3, 1968, 14,761/68; May 6, 1968, 16,142/68
Int. Cl. C08f 3/30, 1/62
U.S. Cl. 260—85.5     19 Claims

ABSTRACT OF THE DISCLOSURE

This application relates to a process for obtaining highly syndiotactic, white, and heat-stable polyvinylchloride particularly suitable for being transformed into fibers by the low temperature bulk-polymerization of vinyl chloride, the polymerization being conducted in the presence of a catalytic system comprising an organic hydroperoxide, an alcoholate of an alkali metal in which the alkyl radical may have a linear or branched chain having from 1 to 6 carbon atoms (or, instead of the alkali metal alcoholate, an alkali metal hydroxide in solution in a linear or branched chain alcohol having from 1 to 5 carbon atoms) and:

(a) an organic sulphite of the general formula:

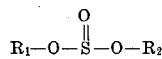

wherein $R_1$ and $R_2$ may be, independently of each other, either a simple or substituted, linear or branched alkyl radical or a cycloalkylic radical such radicals having from 1 to 12 carbon atoms; or
(b) a sulphinic acid of the general formula:

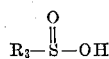

or one of its esters, in which $R_3$ may be a simple or substituted linear or branched alkyl radical, or a cycloalkyl- or aryl-radical such radicals having from 1 to 12 carbon atoms.

The present invention relates to a process for obtaining highly syndiotactic, white and thermally stable polyvinylchloride, particularly suited for being transformed into fibers, by means of the low-temperature bulk polymerization of vinyl chloride.

It is well known that the physical properties of polyvinylchloride depend on the polymerization temperature, in the sense that these properties steadily improve with the gradual lowering of the polymerization temperature.

As a matter of fact, it has been found that when the polymerization of vinyl chloride is carried out at temperatures below 0° C., polymers are obtained which have particular physical characteristics such as an increased percentage of crystallinity combined with a high index of syndiotacticity, a higher glass transition temperature, a higher softening temperature, etc. than in the case of polyvinylchloride obtained at a higher polymerization temperature.

Besides these properties, the polyvinylchloride, in order to be used in the production of industrially useful fibers, must display a high degree of whiteness and a high resistance to yellowing during the heat treatment to which it is subjected during its transformation into fibers.

The carrying out of the low-temperature polymerization of vinyl chloride involves serious difficulties both with regard to the polymerization process as well as the catalyst to be used.

In fact, the only polymerization process which can easily be carried out at a low temperature is bulk polymerization, because the other known polymerization processes, that is, the emulsion- and the solution-polymerizations, are practically unfeasible owing to the difficulty in obtaining an emulsion or a solution at a low temperature. Furthermore, such polymerization processes involve the use of voluminous reactors and great volumes of reactants for obtaining industrially interesting productivity and require high costs for bringing the polymerization mixture down to the desired low temperature, etc.

With regard to the catalyst, the usual polymerization initiators such as organic peroxides, azo-bis-isobutyronitrile, the persulphates and the redox catalysts, in which are used persulphates associated with a reducing agent such as $SO_2$, sodium sulfite or hydrazine, etc., are ineffective in the low-temperature polymerization of vinyl chloride, since these are stable at such low temperatures and do not produce the free radicals required for starting the polymerization.

It is well known that the whiteness and the heat-stability of the color of the polyvinylchloride are related to the chemical nature of the catalytic radicals which remain bound to the ends of the polymeric chains, and therefore to the type of catalyst used.

It is thus evident that in order to obtain a highly syndiotactic polyvinylchloride suited for fibers, it is necessary to provide a catalytic system which shall be active at low temperatures and which, at the same time, shall not adversely influence the color and the heat-stability of the color of the polymer product.

A known catalytic system which actually meets such requirements is that recently suggested by the applicant, and which consists of an organic hydroperoxide, sulphur dioxide and an alcoholate of a metal of the first or second group of the Periodic System or of aluminum.

Previously, it was suggested to carry out the low-temperature bulk polymerization of vinyl chloride by using, as a catalyst, an organo-metal compound selected from a group consisting of zinc-alkyls, cadmium-alkyls, aluminum-alkyls, boro-alkyls, etc. in combination with oxygen or with an oxidizing compound.

In pactice, however, the use of catalysts containing an organometal compound turns out to be rather difficult both because of their self-inflammability when in contact with air as well as the difficulty of their synthesis and their difficult control in the use because even the slightest traces of oxygen not checked during the polymerization may cause wide variations in the polymerization conversion and in the viscosity of the resulting polymer.

Furthermore, the decomposition products of such catalysts, at room temperature or at a higher temperature, prove to be still good polymerization initiators. Consequently, the unreacted recovered monomers containing the decomposition products of said catalysts tend to polymerize during their recovery and storage. Therefore, the problem arises of eliminating completely from the unreacted monomers these decomposition products.

It has now been discovered, in accordance with the present invention, that it is possible to obtain highly syndiotactic polyvinylchloride that is white and highly resistant to color heat-degradation, and which is particularly suited for use in the production of fibers, and without the occurrence of the above-mentioned drawbacks, by low-temperature bulk-polymerizing the vinyl chloride in the presence of a catalytic system consisting or consisting essentially of: an organic hydroperoxide, an alcoholate of an alkali metal in which the alkyl radical may have a linear or branched chain with from 1 to 6 carbon atoms, and:

(a) An organic sulphite of the general formula:

$$R_1-O-\overset{\overset{O}{\|}}{S}-O-R_2$$

wherein $R_1$ and $R_2$ may be, independently of each other, either a simple or substituted, linear or branched alkyl radical or a cycloalkyl radical, such radicals having from 1 to 12 carbon atoms; or (b) A sulphinic acid of the general formula:

$$R_3-\overset{\overset{O}{\|}}{S}OOH$$

or one of its esters, wherein $R_3$ may be either a simple or substituted, linear or branched alkyl radical or a cycloalkyl radical or an aryl radical, such radicals having from 1 to 12 carbon atoms.

Furthermore, it has been discovered as another feature of the present invention that the alcoholate of the alkali metal may be substituted by the hydroxide of the same alkali metal provided that the hydroxide be fed into the reaction mixture in alcoholic solution.

The free radicals produced through the co-action of the three above-mentioned components of the catalytic system, that is, the organic hydroperoxide, the above said sulphur compound and the alkali metal alcoholate or hydroxide, are strongly active and capable of starting the low temperature bulk-polymerization of the vinyl chloride. The simultaneous presence of these three components, therefore, is essential to the catalytic system in that if one of them is missing, no polymerization will take place.

Furthermore, it has been experimentally found that the concentration of the alkali metal alcoholate or hydroxide is a determinant both for the polymerization rate and for the color and color heat-stability of the polyvinylchloride as well as for obtaining polymers having molar weights suited for fiber production. In fact, polymers having a high molecular weight, particularly white and heat-stable, as well as industrially very interesting polymerization rates, can be obtained when: (1) the molar ratio alkali metal alcoholate or hydroxide/organic hydroperoxide is at least 1; and (2) the molar ratio sulphur compound/organic hydroperoxide is at least 1.

In the following Table I are recorded the polymerization conversions, the intrinsic viscosity of the polymer, the color of the polymer expressed as a purity index (PI) and brightness (B) and the heat-stability expressed as a variation of the purity index (ΔPI) and as variation of the brightness (ΔB), in relation to the two above-mentioned molar ratios. The color of the polymer and its heat-stability are determined by means of a General Electric Integrating Spectrophotometer, according to the C.I.E. System of representation and measuring of color.

were contemporaneously and separately added to the reaction mixture. The reaction mixture was then left to react for 1 hour.

In Samples 10 to 16, the bulk-polymerization of the vinyl chloride was carried out in a continuous manner at −30° C., in the presence of 0.06% of tert.butyl-hydroperoxide, and of quantities corresponding to the above-specified ratios of dimethyl-sulphide and sodium methylate. The contact time between the reacting components amounted to 240 minutes.

As will be noticed from the data recorded on Table I, whatever be the polymerization process used, whether continuous or batchwise, best results, both with regard to the quality of the polymer as well as in respect of the conversion, are obtained when the above-mentioned molar ratios are greater than 1.

By the term "organic hydroperoxide" is meant an organic compound having the general formula:

$$R-O-O-H$$

in which R may be a linear or branched alkyl radical, a cyclo-alkyl radical, an aryl or aryl-alkyl radical.

Examples of organic compounds of the general formula R—O—O—H which may advantageously be used in the polymerization process of this invention, are: methyl-, ethyl-, n.propyl-, tert.butyl-, n.butyl-, amyl-, hexyl-, octyl-, etc. hydroperoxide, ethyl-benzyl-hydroperoxide, isobutyl-benzyl-hydroperoxide, phenyl - isopropyl - hydroperoxide, etc.

Particularly advantageous results are obtained by using cumene-hydroperoxide and tertiary-butyl-hydroperoxide.

It is to be expressly noted that, as distinct from hydroperoxides, the organic peroxides of the general formula R—O—O—R are ineffective in the process of this invention.

The concentration of the organic hydroperoxide is not critical and typically may vary from 0.01% to 3% by weight with reference to the monomeric material present. Concentrations of hydroperoxide between 0.02% and 1% by weight are preferred.

The organic hydroperoxide may be fed into the reaction mixture either as such or in solution in a suitable inert solvent such as methyl-, ethyl or propyl-alcohol, hexane, etc.

There are many organic sulphites, sulphinic acids or their esters having the above-mentioned general formulae that may be advantageously used together with the organic hydroperoxide and with an alkali metal alcoholate or hydroxide for starting the low-temperature bulk polymerization of vinyl chloride. Among these may be mentioned dimethyl-sulphite, diethyl-sulphite, di-n-propyl-sul-

TABLE I

| Sample No. | Molar ratio dimethylsulphite/tert.-butyl-hydroperoxide | Alcoholate or hydroxide | Molar ratio alcoholate or hydroxide/tert.butyl-hydroperoxide | Conversion, percent | Intrinsic viscosity, dl./g. | Original color PI | B | Heat-stability ΔPI | ΔB |
|---|---|---|---|---|---|---|---|---|---|
| 1 | 0.5 | Potassium hydroxide | 0.5 | 0.4 | 1.04 | 92.7 | 90.5 | 6.5 | 25.2 |
| 2 | 0.5 | do | 1 | 0.8 | 1.10 | 93.4 | 92.1 | 5.4 | 20.2 |
| 3 | 0.5 | do | 2 | 1.5 | 1.15 | 94.2 | 93.0 | 5.2 | 18.3 |
| 4 | 1 | do | 0.5 | 1.1 | 1.09 | 94.0 | 92.1 | 5.6 | 18.2 |
| 5 | 1 | do | 1 | 4 | 1.30 | 97.5 | 94.0 | 2.0 | 15.0 |
| 6 | 1 | do | 2 | 6.8 | 1.70 | 98.6 | 94.1 | 1.8 | 14.8 |
| 7 | 2 | do | 0.5 | 1.3 | 1.10 | 94.7 | 92.0 | 4.5 | 18.0 |
| 8 | 2 | do | 1 | 4.8 | 1.19 | 98.2 | 94.3 | 1.7 | 13.2 |
| 9 | 2 | do | 2 | 8.2 | 1.90 | 99.2 | 94.6 | 1.5 | 13.0 |
| 10 | 0.5 | Sodium methylate | 2 | 2.5 | 0.85 | 95.6 | 90.4 | 5.6 | 25.0 |
| 11 | 3 | do | 0.5 | 2 | 0.54 | 95.0 | 90.5 | 6.0 | 27.0 |
| 12 | 3 | do | 0.75 | 3 | 0.80 | 95.8 | 90.5 | 5.0 | 26.0 |
| 13 | 3 | do | 1 | 4.8 | 1.12 | 97.9 | 91.5 | 2.0 | 24.0 |
| 14 | 3 | do | 2 | 8 | 1.26 | 98.8 | 95.5 | 1.0 | 13.5 |
| 15 | 3 | do | 3 | 9.6 | 1.30 | 99.0 | 95.9 | 1.2 | 12.8 |
| 16 | 3 | do | 4 | 10 | 1.22 | 99.1 | 95.8 | 1.2 | 11.7 |

In Samples 1 to 9, the bulk-polymerization of the vinyl chloride was carired out batchwise at −30° C. and in the presence of 0.5% of tert.butyl-hydroperoxide and of quantities corresponding to the above-mentioned ratios of dimethyl-sulphite and potassium hydroxide in alcoholic solution at 12%. The components of the catalytic system phite, di-tert.butyl-sulphite, butyl-ethyl-sulphite, di-amyl-sulphite, di-dodecyl-sulphite, di-cyclohexyl-sulphite, di-(β-phenyl-ethyl)-sulphite, etc., methane-sulphonic acid, benzene-sulphinic acid, p-methyl-benzene-sulphinic acid, etc., as well as the corresponding alkyl- or aryl-esters such as methyl-, ethyl-, propyl-, butyl-sulphinates.

Amongst these sulphur organic compounds, however, the best results have been obtained by using di-alkyl-sulphites in which the alkyl radical has from 1 to 4 carbon atoms, or aryl-sulphinic acids.

The concentration of these sulphur compounds may vary from about 0.01% to about 2% by weight with respect to the monomeric material present, but concentrations between 0.035 and 1% by weight are particularly preferred. There may also be used concentrations greater than 2% by weight, although in practice it is preferred that these concentrations remain below 2% in as much as concentrations exceeding this limit involve very high polymerization rates, which give rise in the bulk polymerization to several drawbacks, chiefly with regard to the exchange of the heat of polymerization.

The alcoholates of an alkali metal, such as specified above, comprise the methylates, ethylates, propylates, isopropylates, tert.-butylates, n.butylates, n.amylates, tert.-amylates and the like, of sodium, of potassium, of lithium, etc.

The short chain alcoholates, having from 1 to 4 carbon atoms, are preferred for solubility reasons, but amongst these the alcoholates obtained by direct reaction between the alcohol and the alkali metal are particularly preferred for reasons of economy and ease of preparation, such as, for instance, sodium or potassium methylate or ethylate. The proportion of alcoholate in the reaction mixture varies between 0.01% and 3% by weight referred to the monomer or monomer mixture, although quantities between 0.025% and 0.5% are preferred.

The alcoholates may be added to the reaction mixture either in pure form or, better still, dissolved in an inert organic solvent. The best organic solvents for the alcoholates are the aliphatic alcohols having from 1 to 5 carbon atoms, and amongst these, the methyl and ethyl alcohols are preferred.

The nature and the proportion of these solvents have no influence on the course of polymerization, although for economic reasons, concentrated solutions of alcoholates are preferred.

Furthermore, by experiment, it has been found that, while the alkali metal alcoholates influence the reaction, at temperatures below 0° C. and in vinyl chloride monomer as reaction medium, between the sulphur organic compound and the hydroperoxide by forming free radicals, which successively promote the low-temperature bulk polymerization of the vinyl chloride, the aliphatic alcohols do not exercise any influence on that reaction, so that no free racidals are formed and, thus, no polymerization takes place.

When a hydroxide of an alkali metal is used in place of the alcoholate, such a hydroxide is fed into the reaction mixture dissolved in an aliphatic alcohol. For practical reasons, as solvents, aliphatic alcohols having from 1 to 5 carbon atoms are preferred, and amongst these methyl and ethyl alcohols are particularly preferred. The nature and the quantity of these solvents have no influence on the polymerization course even if, for economic reasons, concentrated solutions are used. Under this aspect, the preferred solvent is methyl alcohol by means of which it is possible to obtain solutions containing more than 10% by weight of the hydroxide.

Among the hydroxides of the alkali metals, sodium or potassium hydroxides are preferred.

The concentration of hydroxide in the reaction mixture may vary between about 0.03% and about 2% by weight referred to the monomeric system. Concentrations between 0.05% and 1% by weight are preferred.

By the term "low temperature" is meant a temperature below 0° C. and more particularly temperatures between —10° and —70° C. Such temperature of the reaction mixture is controlled by conventional means, as for instance, by keeping the reactor in a cryostatic bath, or by circulating a refrigerating fluid around the walls of the reactor or in coils inside the reactor.

By the term "bulk polymerization" as used herein, it is to be understood not only that the polymerization is carried out by the catalytic system in the undiluted monomer, but also in the presence of minor quantities of non-reacting organic compounds, liquid at the polymerization temperature, and which exert a fluidizing action on the polymerization slurry, to render this latter more easily stirrable and to facilitate heat transfer through the polymerization vessel.

As fluidizing agent, the following substances are suitable: saturated aliphatic hydrocarbons, aryl-hydrocarbons, cycloalkyl-hydrocarbons, saturated halogenated hydrocarbons, etc.

Small quantities of alkyl-mercaptans may be introduced into the polymerization mixture for regulating the molecular weight of the polymer. It has been noted that these alkyl-mercaptans, besides acting as chain regulators, also act as fluidizers of the polymerization mixture. The alkyl-mercaptans having from 1 to 15 carbon atoms are preferred, and amongst these, the ones having from 4 to 8 carbon atoms (e.g., n-butyl-mercaptan) yield the best results.

It is advisable to conduct the polymerization in the absence of oxygen which exerts an inhibiting effect on the polymerization. In general for this purpose, for displacing the air from the polymerization reactor suitable inert gases, such as nitrogen, are used.

The polymerization process, in practice, may be conducted either in a continuous, semi-continuous or batch-wise mode of operation. In the continuous and in the semi-continuous polymerization processes, the three components of the catalytic system are continuously fed into the reaction mixture by three separate supply lines, that is, one for the organic hydroperoxide, one for the sulphur organic compound and the third one for the alcoholic solution of the alkali metal alcoholate or hydroxide.

The polymerization may be short-stopped at any desired level, that is, at the desired monomer conversion and at the desired molecular weight, by treating the reaction mixture with an aqueous or alcoholic solution of a salt of hydroxylamine, preferably hydroxylamine hydrochloride or hydroxylamine sulphate. In the case of a continuous polymerization process, the solution of the hydroxylamine salt may be added either in the overflow pipe at the outlet of the polymerization reactor or in the container tank or in a subsequent tank containing water heated at 50° C., wherein the short-stopping and the separation by evaporation of the unreacted monomer from the polymer are carried out simultaneously.

The polyvinylchloride obtained according to the process of this invention displays a high degree of syndiotacticity, a homogeneous molecular weight, and, furthermore, it is very white and shows an excellent heat-stability. For these specific properties, it is particularly suited for being transformed into fibers, films, filaments, etc., which show excellent physical, chemical and mechanical properties.

It is to be understood that the catalytic systems used in the process according to the present invention may advantageously also be applied to the preparation of copolymers of vinyl chloride containing up to 50% by weight of at least one other ethylenically unsaturated monomer copolymerizable with vinyl chloride. The only difference in such a case is that the starting monomeric material is a mixture of vinyl chloride and one or more other ethylenically unsaturated monomers copolymerizable therewith. By the term "ethylenically unsaturated monomers" are meant organic compounds containing the $C=C$ group. Examples of such compounds are vinyl and vinylidene compounds such as vinylidene chloride or fluoride, vinyl fluoride, vinyl esters of aliphatic carboxylic acids containing from 2 to 18 carbon atoms, such as, for instance, the vinyl esters of acetic acid, propionic acid, etc., the acrylic type monomers such as acrylic acid, methacrylic acid and their derivatives such as acrylonitrile, acrylates or methacrylates of aliphatic alcohols containing from 1 to 12 carbon atoms, and especially methyl acrylate and methyl methacrylate, etc.

In order to illustrate still more fully the inventive idea

(10) Glass-transition temperature (Tg), determined according to the procedure described in the J. Polymer Sci., vol. 56 (1962), pp. 225–231.

TABLE II

| Vinyl chloride in g./hr. | Organic hydroperoxide | g./hr. | Sulphur compound | g./hr. | Alkali metal* alcoholate | g./hr. | ($\eta$) in dl./g. | Conversion in percent | Original color | | Heat-stability | | SI | Tg, °C. |
|---|---|---|---|---|---|---|---|---|---|---|---|---|---|---|
| | | | | | | | | | PI | B | $\Delta$PI | $\Delta$B | | |
| 500 | Tert.butyl hydroperoxide. | 0.29 | Dimethyl sulphite. | 0.36 | Sodium methylate. | | | 0 | | | | | | |
| 500 | ___do___ | 0.29 | ___do___ | | ___do___ | 0.35 | | 0 | | | | | | |
| 500 | ___do___ | 0.29 | ___do___ | 0.36 | ___do___ | 0.35 | 0.98 | 6 | 99.7 | 86.1 | 7.3 | 11.4 | 2.15 | 103 |
| 500 | ___do___ | 0.29 | ___do___ | 0.72 | ___do___ | 0.35 | 1.10 | 7.7 | 99.7 | 92.5 | 3.8 | 10.4 | 2.20 | 104 |
| 500 | ___do___ | 0.29 | ___do___ | 1.08 | ___do___ | 0.35 | 1.25 | 8.05 | 99.0 | 93.0 | 0.5 | 5.1 | 2.10 | 103 |
| 500 | ___do___ | 0.29 | ___do___ | 1.08 | ___do___ | 0.175 | 1.20 | 6.75 | 99.0 | 90.2 | 2.8 | 6.1 | 2.20 | 103 |
| 500 | ___do___ | 0.29 | ___do___ | 1.08 | ___do___ | 0.53 | 1.24 | 9.22 | 99.3 | 93.6 | 0.5 | 5.8 | 2.15 | 105 |
| 500 | ___do___ | 0.29 | ___do___ | 1.08 | ___do___ | 0.70 | 1.21 | 10.18 | 99.5 | 94.0 | 0.9 | 6.4 | 2.10 | 105 |
| 1,000 | Cumene-hydroperoxide. | 1.5 | p.Toluene sulphinic acid. | 3.08 | ___do___ | 1.06 | 1.4 | 12 | 99.0 | 95.0 | 1.0 | 6 | 2.05 | 105 |
| 1,000 | ___do___ | 1.5 | ___do___ | 3.08 | ___do___ | | | 0 | | | | | | |
| 1,000 | ___do___ | 1.5 | di-Amyl-sulphite. | 4.47 | Sodium-methylate. | 2.07 | 1.56 | 8.9 | 98.7 | 94.8 | 2.0 | 7.5 | 2.1 | 105 |
| 1,000 | Tert.butyl hydroperoxide. | 0.86 | Benzene-sulphinic acid. | 2.60 | ___do___ | 1.06 | 1.69 | 9.8 | 99.3 | 92.0 | 1.8 | 8.5 | 2.1 | 104.5 |

*The alkali metal alcoholates are fed in 10% by weight methanolic or ethanolic solution.

of this invention, the following examples are given:

EXAMPLE 1

Into a 2 liter glass polymerization reactor, provided with a stirrer, a cooling system and a thermometer, were continuously fed:

vinyl chloride,
an organic hydroperoxide of the type and at a feed rate as reported in the following Table II,
an organic sulphur compound of the type and at a feed rate as reported in the following Table II,
an alkali metal alcoholate of the type and at a feed rate as reported in the following Table II.

The polymerization reactor was maintained at a temperature of —30° C. by means of a thermostatically controlled bath.

Through an overflow pipe the polymer suspension thus obtained was discharged into an aqueous solution of hydroxylamine hydrochloride kept at a pH of 6 by sodium bicarbonate.

The polymer was separated by centrifugation and was then washed with methanol and ethyl ether, finally being dried.

In Table II are recorded:

(1) The feed rate of vinyl chloride, in g./hr.
(2) The type and the feed rate of hydroperoxide, in g./hr.
(3) The type and the feed rate of sulphur compound, in g./hr.
(4) The type and the feed rate of alkali metal alcoholate, in g./hr.
(5) The intrinsic viscosity ($\eta$) of the polymer obtained, determined in cyclohexanone at 30° C., and expressed in dl./g.
(6) The conversion expressed in percent with respect to the monomer.
(7) The original color of the polymer, determined by means of the General Electric Integrating Spectrophotometer according to the C.I.E. system of representation and measurement of color. According to this system, the color is expressed in terms of purity index (PI) and brightness (B) referred to the standard illumination.
(8) Heat-stability or heat-sensitivity, expressed by the variation of the purity index ($\Delta$PI) and by the variation of the brightness ($\Delta$B) of the polymer after heating in a forced air oven for 1 hour at 110° C.
(9) Syndiotactic index (SI) determined on the basis of the ratio between the absorption of infrared bands D635 cm.$^{-1}$ and D693 cm.$^{-1}$ as described by Fordham, Burleigh and Sturn, in J. Polymer Sci., vol. XLI, pages 73–82 (1959).

EXAMPLE 2

Into a 2 liter polymerization reactor maintained at —50° C. by means of a thermostatically controlled bath, were introduced 2000 g. of vinyl chloride, 2.0 g. of tert.butylhydroperoxide, 0.2 g. of n-butylmercaptan and 3.5 g. of sodium ethylate. Successively, during 3 hours, 3.0 g. of dimethylsulphite dissolved in 30 cc. of methyl alcohol were fed. After the feeding was completed, the reactor was maintained at —50° C. for a further 2 hours.

After this, the reaction mixture was discharged and the polymer recovered by filtering. The polymer thus obtained was then washed with methanol and then dried in an oven, under vacuum, at 50° C. for 12 hours.

220 g. of polymer (conversion 11%) were obtained which showed the following characteristics:

Intrinsic viscosity _____ 1.45
Syndiotactic index _____ 2.45
Tg, ° C. _____ 108
Original color:
  PI _____ 99.3
  B _____ 95.4
Heat-sensitivity:
  $\Delta$PI _____ 2.7
  $\Delta$B _____ 8.6

EXAMPLE 3

Into a 2 liter polymerization reactor, kept at a temperature of —40° C. by means of a thermostatically controlled bath, 2000 g. of vinyl chloride, 4.0 g. of p.toluene-sulphinic acid and 3.5 g. of sodium methylate were introduced. Successively, during 3 hours, 2.0 g. of tert.butyl-hydroperoxide dissolved in 20 cc. of methyl alcohol were fed. After the feeding was completed, the reactor was maintained at —40° C. for a further 2 hours. Thereafter the same procedure as in Example 2 was followed.

260 g. of polymer (conversion=13%) were obtained showing the following characteristics:

Intrinsic viscosity _____ 1.36
Syndiotactic index _____ 2.40
Tg, ° C. _____ 106
Original color:
  PI _____ 99.4
  B _____ 95.2
Heat-sensitivity:
  $\Delta$PI _____ 3.2
  $\Delta$B _____ 8.2

EXAMPLE 4

Into a 2 liter polymerization reactor, maintained at —30° C. by a thermostatically controlled bath, were introduced 2000 g. of vinyl chloride and 2.0 g. of tert.butyl-hydroperoxide. Successively, during a period of 3 hours, were fed into the mixture 3.0 g. of dimethyl-sulphite dissolved in 30 cc. of methyl alcohol.

After 5 hours no formation of polymer was noticed. By adding to this mixture 5 g. of sodium methylate, during 2 hours, 320 g. of polymer were obtained.

EXAMPLE 5

Into a 2 liter glass polymerization reactor, provided with a stirrer, a cooling system and a thermometer, were continuously fed:

vinyl chloride, an organic hydroperoxide of the type and at a feed rate as recorded in the following Table III, an organic sulphur compound of the type and at a feed rate as recorded in the following Table III, and an alkali metal hydroxide of the type and at a feed rate as recorded in the following Table III.

The polymerization reactor was maintained at a constant temperature of −30° C. by means of a thermostatically controlled bath.

The slurry thus obtained was discharged through an overflow tube into an aqueous solution at 50° C. of hydroxylamine hydrochloride maintained at a pH of 6 by sodium bicarbonate. The polymer was separated by centrifugation and was then washed with methanol and with ethyl ether and finally dried.

In Table III are recorded:

(1) The feed rate of vinyl chloride in g./hr.
(2) The type and the feed rate of hydroperoxide, in g./hr.
(3) The type and the feed rate of sulphur compound, in g./hr.
(4) The type and the feed rate of alkali metal hydroxide, in g./hr.
(5) The intrinsic viscosity ($\eta$) of the obtained polymer.
(6) The conversion.
(7) The original color of the polymer.
(8) Heat-stability or heat-sensitivity.
(9) Syndiotactic index (SI).
(10 Glass-transition temperature (Tg.).

was washed with methanol and thereafter dried in an oven at 50° C., under vacuum, for 12 hours.

180 g. of polymer (conversion=9%) were obtained showing the following properties:

Intrinsic viscosity _____ 1.58
Syndiotactic index _____ 2.48
Tg, ° C. _____ 107
Original color:
  PI _____ 99.2
  B _____ 94.8
Thermal sensitivity:
  ΔPI _____ 1.6
  ΔB _____ 9.9

EXAMPLE 7

Into a 2 liter polymerization reactor, maintained at −20° C. by means of a thermostatically controlled bath, were introduced 2000 g. of vinyl chloride, 2.0 g. of tert.-butyl-hydroperoxide and 2.5 g. of potassium hydroxide in solution at 10% in methanol. Then, during three hours, into the reaction mixture were fed 2.4 g. of dimethyl sulphite dissolved in 10 cc. of methyl alcohol. After completion of the feeding, the reactor was maintained at −20° C. for further 2 hours. Thereafter the process as described in Example 2 was followed.

210 g. of polymer (conversion=10.5%) were obtained, showing the following properties:

Intrinsic viscosity _____ 1.45
Syndiotactic index _____ 2.10
Tg, ° C. _____ 102
Original color:
  PI _____ 99.1
  B _____ 94.8
Heat-sensitivity
  ΔPI _____ 2.8
  ΔB _____ 9.6

EXAMPLE 8

Into a 2 liter polymerization reactor, maintained at −30° C. by means of a thermostatically controlled bath, 2000 g. of vinyl chloride and 2.0 g. of tert.butyl-hydroperoxide were introduced.

TABLE III

| Vinyl chloride in g./hr. | Organic hydroperoxide | G./hr. | Organic sulphur compound | G./hr. | Alkali metal hydroxide | G./hr.* | Conversion, percent | Intrinsic viscosity [η] in dl./g. | Tg, ° C. | S.I. | Original color | | Heat sensitivity | |
|---|---|---|---|---|---|---|---|---|---|---|---|---|---|---|
| | | | | | | | | | | | PI | B | ΔPI | ΔB |
| 1,000 | tert.Butyl-hydro-oxide. | 3 | di (βphenyl-ethyl) sulphite. | 14.5 | Potassium hydroxide. | 3.72 | 5.6 | 1.35 | 101 | 2.15 | 98.6 | 94.6 | 1.8 | 13.0 |
| 1,000 | do | 3 | di-Isopropyl-sulphite. | 8.3 | do | 3.72 | 6.2 | 1.42 | 102 | 2.20 | 98.7 | 94.2 | 1.7 | 14.0 |
| 1,000 | do | 3 | dimethyl-sulphite. | 5.5 | Sodium hydroxide. | 2.66 | 7.5 | 1.57 | 101 | 2.20 | 99.2 | 94.2 | 1.6 | 13.0 |
| 1,000 | Cumene hydroperoxide. | 5 | di-Amyl-sulphite. | 10.5 | Potassium hydroxide. | 3.68 | 5.1 | 1.50 | 101 | 2.20 | 99.1 | 94.4 | 1.5 | 13.2 |
| 1,000 | tert.Butyl-hydroperoxide. | 1 | Dimethyl-sulphite. | 1.8 | do | 1.22 | 4.1 | 1.40 | 102 | 2.15 | 98.8 | 94.6 | 1.4 | 13.6 |

*The alkali metal hydroxides are fed in 10% by weight methanolic or ethanolic solution.

EXAMPLE 6

Into a 2 liter polymerization reactor maintained at −50° C. by means of a thermostatically controlled bath, 2000 g. of vinyl chloride, 1.6 g. of tert.butyl-hydroperoxide, 0.2 g. of n-butylmercaptan and 4.0 g. of potassium hydroxide dissolved in methyl alcohol were introduced.

Successively, during three hours, 3.8 g. of dimethyl sulphite dissolved in 30 cc. of methyl alcohol were fed. After the feeding was completed the reactor was maintained at −50° C. for a further 2 hours.

The reaction mixture was then discharged and the polymer was recovered by filtering. The polymer thus obtained Then 3.0 g. of dimethyl-sulphite dissolved in 30 cc. of methyl alcohol were fed, during 3 hours.

After 5 hours there still was not noticed any polymer formations. Upon adding to this mixture 7 g. of potassium hydroxide in methanolic solution at 10%, 240 g. of polymer were obtained after 3 hours.

What is claimed is:

1. A process for obtaining highly syndiotactic, white, and heat-stable polyvinylchloride particularly suitable for being transformed into fibers, by bulk-polymerization of vinyl chloride at a temperature below 0° C., the polymerization being conducted in the presence of a catalytic system comprising an organic hydroperoxide in a concentration varying from 0.01% to 3% by weight with respect to monomer, an alcoholate of an alkali metal in which the alkyl radical may have a linear or branched chain having from 1 to 6 carbon atoms in a concentration varying from 0.01% to 3% by weight with respect to monomer, or an alkali metal hydroxide in a concentration varying from 0.03% to 2% by weight with respect to monomer and present in solution in a linear or branched chain alcohol having from 1 to 5 carbon atoms, and from 0.01% to 2% by weight with respect to monomer of:

(a) an organic sulphite of the general formula:

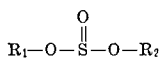

wherein $R_1$ and $R_2$ may be, independently of each other, either a simple or substituted, linear or branched alkyl radical or a cycloalkyl radical such radicals having from 1 to 12 carbon atoms; or (b) a sulphinic acid of the general formula:

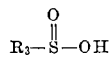

or one of its esters, in which $R_3$ may be a simple or substituted linear or branched alkyl radical, or a cycloalkyl- or aryl-radical such radicals having from 1 to 12 carbon atoms.

2. A process according to claim 1, wherein the alkali metal alcoholate is fed in solution in an inert organic solvent.

3. A process according to claim 2, wherein the inert organic solvent is an aliphatic alcohol having from 1 to 5 carbon atoms.

4. A process according to claim 3, wherein the aliphatic alcohol is methyl alcohol or ethyl alcohol.

5. A process according to claim 1, wherein the alkali metal alcoholate is sodium or potassium methylate or ethylate.

6. A process according to claim 1, wherein said concentration varies from 0.25% to 0.5% by weight with respect to the monomers.

7. A process according to claim 1, wherein the alkali metal hydroxide is fed in a methanolic solution.

8. A process according to claim 1, wherein the alkali metal hydroxide is sodium or potassium hydroxide.

9. A process according to claim 1, wherein the concentration of the alkali metal hydroxide varies from 0.05 to 1% by weight with respect to the monomers.

10. A process according to claim 1, wherein the molar ratio alkali metal alcoholate or hydroxide/organic hydroperoxide is at least 1 and the molar ratio organic sulphite or sulphinic acid or its ester/organic hydroperoxide is at least. 1.

11. A process according to claim 1, wherein the concentration of the organic hydroperoxide varies from 0.02% to 1% by weight with respect to the monomers.

12. A process according to claim 1, wherein said concentration varies between 0.035 and 1.0% by weight with respect to the monomers.

13. A process according to claim 1, wherein as organic hydroperoxide, cumene-hydroperoxide or tert.butyl-hydroperoxide is used.

14. A process according to claim 1, wherein the organic hydroperoxide is fed in solution in an inert organic solvent.

15. A process according to claim 14, wherein the inert organic solvent is methyl or ethyl alcohol.

16. A process according to claim 1, wherein the temperature is between $-10°$ and $-70°$ C.

17. A process according to claim 1, wherein the polymerization is conducted in the presence of an alkyl-mercaptan having from 1 to 15 carbon atoms.

18. A process according to claim 1, wherein the polymerization is inhibited at any desired point by treating the polymerization mixture with a solution of a salt of hydroxylamine.

19. A process according to claim 1, wherein the vinyl chloride is copolymerized with up to 50% of at least another ethylenically unsaturated monomer copolymerizable with it.

References Cited

UNITED STATES PATENTS 3,382,223    5/1968    Borsini et al. _____ 260—92.8

JOSEPH L. SCHOFER, Primary Examiner

J. A. DONAHUE JR., Assistant Examiner

U.S. Cl. X.R.

260—86.3, 87.1, 87.5, 87.5 A, 87.7, 92.8